(12) United States Patent
Carter

(10) Patent No.: US 9,183,524 B2
(45) Date of Patent: Nov. 10, 2015

(54) IMAGED-BASED METHOD FOR TRANSPORT AND AUTHENTICATION OF VIRTUALIZED WORKFLOWS

(75) Inventor: Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1554 days.

(21) Appl. No.: 11/692,309

(22) Filed: Mar. 28, 2007

(65) Prior Publication Data

US 2008/0201708 A1    Aug. 21, 2008

Related U.S. Application Data

(63) Continuation-in-part of application No. 11/677,250, filed on Feb. 21, 2007, now abandoned.

(51) Int. Cl.

| | |
|---|---|
| *G06Q 10/06* | (2012.01) |
| *G06F 21/30* | (2013.01) |
| *G06F 21/10* | (2013.01) |
| *G06F 9/455* | (2006.01) |
| *G06F 21/12* | (2013.01) |
| *G06F 21/33* | (2013.01) |
| *H04L 29/06* | (2006.01) |

(52) U.S. Cl.
CPC .......... *G06Q 10/06316* (2013.01); *G06F 21/10* (2013.01); *G06F 21/121* (2013.01); *G06F 21/30* (2013.01); *G06F 21/33* (2013.01); *G06Q 10/06* (2013.01); *G06F 2009/4557* (2013.01); *H04L 63/08* (2013.01)

(58) Field of Classification Search
CPC ... H04L 63/20; H04L 63/164; H04L 63/0272; H04L 12/4641; H04L 63/08; G06F 9/45533; G06F 9/5077; G06F 9/45537; G06F 9/445; G06F 9/455; G06F 2009/4557; G06F 21/30; G06F 21/10; G06Q 10/06316
USPC ............. 718/1; 726/15; 716/15; 705/7.26, 51
See application file for complete search history.

(56) References Cited

U.S. PATENT DOCUMENTS

| | | | | |
|---|---|---|---|---|
| 6,073,242 | A  * | 6/2000 | Hardy et al. | 726/1 |
| 6,349,238 | B1 * | 2/2002 | Gabbita et al. | 700/101 |
| 6,397,242 | B1 * | 5/2002 | Devine et al. | 718/1 |
| 6,496,847 | B1 * | 12/2002 | Bugnion et al. | 718/1 |

(Continued)

FOREIGN PATENT DOCUMENTS

| | | | | |
|---|---|---|---|---|
| EP | 1560394 | A1 | 8/2005 | |
| EP | 1696378 | A1 * | 8/2006 | G06Q 10/00 |
| EP | 1732024 | A1 | 12/2006 | |

OTHER PUBLICATIONS

Geert Van de Putte, Business Process Management using MQSeries and Partner Agreement Manager (selection), IBM redbooks, SG24-6166-00, ISBN 0738419710, May 11, 2001.*

(Continued)

*Primary Examiner* — Octavian Rotaru
(74) *Attorney, Agent, or Firm* — Schwegman Lundberg & Woessner, P.A.

(57) ABSTRACT

Techniques for virtualized workflow processing are presented. A processing state of workflow within a first processing environment is imaged and configured for a second processing environment. The image is received in the second processing environment where it is authenticated and initiated within the second processing environment as a virtual machine.

2 Claims, 3 Drawing Sheets

(56) References Cited

U.S. PATENT DOCUMENTS

| | | | |
|---|---|---|---|
| 6,704,925 B1* | 3/2004 | Bugnion | 717/138 |
| 6,966,060 B1* | 11/2005 | Young et al. | 717/177 |
| 6,986,138 B1* | 1/2006 | Sakaguchi et al. | 718/105 |
| 7,035,808 B1* | 4/2006 | Ford | 705/7.14 |
| 7,139,761 B2* | 11/2006 | McKibben et al. | 707/792 |
| 7,349,864 B2* | 3/2008 | Ohsaki | 705/7.26 |
| 7,415,485 B2* | 8/2008 | Brooks et al. | 717/166 |
| 7,484,208 B1* | 1/2009 | Nelson | 718/1 |
| 7,603,301 B1* | 10/2009 | Regan | 705/31 |
| 7,607,171 B1* | 10/2009 | Marsden et al. | 726/24 |
| 7,653,562 B2* | 1/2010 | Schulz et al. | 705/7.27 |
| 7,668,763 B1* | 2/2010 | Albrecht | 705/31 |
| 7,792,693 B2* | 9/2010 | Bultmeyer et al. | 705/7.26 |
| 7,793,101 B2* | 9/2010 | Wipfel et al. | 713/168 |
| 7,937,655 B2* | 5/2011 | Teng et al. | 715/255 |
| 8,239,233 B1* | 8/2012 | Albrecht | 705/7.15 |
| 8,464,250 B1* | 6/2013 | Ansel | 718/1 |
| 2002/0010741 A1 | 1/2002 | Stewart et al. | |
| 2002/0049853 A1* | 4/2002 | Chu et al. | 709/237 |
| 2003/0036940 A1* | 2/2003 | Leymann et al. | 705/8 |
| 2003/0149714 A1* | 8/2003 | Casati et al. | 709/100 |
| 2003/0195763 A1 | 10/2003 | Gulcu et al. | |
| 2003/0233374 A1* | 12/2003 | Spinola et al. | 707/104.1 |
| 2003/0236838 A1 | 12/2003 | Ouchi | |
| 2004/0003353 A1 | 1/2004 | Rivera et al. | |
| 2004/0083481 A1* | 4/2004 | Shultz et al. | 719/312 |
| 2004/0122835 A1 | 6/2004 | McKibben et al. | |
| 2004/0177249 A1 | 9/2004 | Keohane et al. | |
| 2005/0120199 A1* | 6/2005 | Carter | 713/150 |
| 2005/0251802 A1* | 11/2005 | Bozek et al. | 718/1 |
| 2005/0268298 A1* | 12/2005 | Hunt et al. | 718/1 |
| 2006/0005189 A1* | 1/2006 | Vega et al. | 718/1 |
| 2006/0021023 A1 | 1/2006 | Stewart et al. | |
| 2006/0069596 A1 | 3/2006 | Hatoun et al. | |
| 2006/0069605 A1 | 3/2006 | Hatoun | |
| 2006/0085412 A1 | 4/2006 | Johnson et al. | |
| 2006/0111888 A1* | 5/2006 | Hiew et al. | 703/22 |
| 2006/0161615 A1 | 7/2006 | Brooks et al. | |
| 2006/0173724 A1* | 8/2006 | Trefler et al. | 705/8 |
| 2006/0195347 A1* | 8/2006 | Bultmeyer et al. | 705/8 |
| 2006/0195715 A1* | 8/2006 | Herington | 714/4 |
| 2006/0229924 A1* | 10/2006 | Aron et al. | 705/8 |
| 2006/0259524 A1* | 11/2006 | Horton | 707/201 |
| 2006/0277595 A1* | 12/2006 | Kinser et al. | 726/3 |
| 2007/0250833 A1* | 10/2007 | Araujo et al. | 718/1 |
| 2007/0300220 A1* | 12/2007 | Seliger et al. | 718/1 |
| 2008/0201191 A1* | 8/2008 | Carter | 705/8 |
| 2009/0282101 A1* | 11/2009 | Lim et al. | 709/203 |

OTHER PUBLICATIONS

Liu, Duen Ren, Workflow modeling for virtual processes, an order-preserving process view approach Institute of Information Management, Elsevier Science Ltd. Apr. 20, 2002.*
Ask Karin, Automatic Malware Signature Generation, Ikarus Software GmH, Oct. 16, 2006.*
Aycock John, Computer viruses and Malware, ISBN 0-387-34188-9, Springer 2006.*
Gigafide you tube channel, Make a fake virus, posted Mar. 11, 2008, available: http://www.youtube.com/watch?v=sYty5Wz-Oxg http://www.tinkernut.com/archives/46.*
Greenberg, Michael S. et al, Mobile Agents and Security, IEEE Communications Magazine, XP002487168, Jul. 1998.*
Zimmerman Daniel M, A Preliminary Investigation into Dynamic Distributed Workflow, Master of Science Thesis, California Institute of Technology, 1998.*
Clark et al, Live Migration of Virtual Machines, University of Cambridge, Computer and Science Technology, 2006 http://www.cl.cam.ac.uk/research/srg/netos/papers/2005-migration-nsdi-pre.pdf.*
Housley et al, Internet x 509 Public Key Infrastructure Certificate and CRL Profile, ietf-org, Jan. 1999 http://www.ietf.org/rfc/rfc2459.txt.*
IBM Migration Guide, v5 release 1,GC24-6103-00, Dec. 2004 http://www.vm.ibm.com/pubs/hcsf9b01.pdf.*

Microsoft Java Virtual Machine Migration Guide for Developers. Version 2-2, Apr. 2004.*
Miller et al, Security for the METEOR Workflow Management System, Citeseer 1999 http://citeseerx.ist.psu.edu/viewdoc/summary?doi=10.1.1.30.9162.*
Novell list of products, archives-org, Jan. 11, 2006 http://www.novell.com/documentation/suse.html retrieved via archives.org.*
VMware Virtual Machine Importer User Manual, vmware, Nov. 7, 2005 http://www.vmware.com/pdf/v2v15_manual.pdf.*
VMware VirtualCenter Infrastructure, Dell Power Solutions, Nov. 2005 http://www.dell.com/downloads/global/power/ps4q05-20050285-Stanford.pdf.*
VMware VirtualCenter, Technical Best Practices, Jun. 2005 http://www.vmware.com/pdf/vc_technical_best.pdf.*
Deng et al, A Unified Arhitectural model for On Demand User-Centric Communications, CiteSeer 2005 http://citeseerx.ist.psu.edu/viewdoc/summary?doi=10.1.1.70.397.*
Hu et al, A virtual laboratory for IT security education, EMISA 2004, p. 56, 60-71, Bonn, 2004 http://subs.emis.de/LNI/Proceedings/Proceedings56/article3466.html.*
Cloning HD Simulation Norton Ghost 2003, youtube, uploaded Dec. 10, 2009, product Norton Ghost 2003 http://www.youtube.com/watch?v=gOlDlxl9JR0.*
How to use Sysprep file with Windows Product Activation or Volume License Media to deploy Windows XP, Microsoft Webpages 2005 http://support.microsoft.com/kb/299840.*
Preserving OEM Pre-Activation when Re-installing Windows XP, Windows Webpages, Apr. 20, 2005 http://technet.microsoft.com/en-us/library/bb457078.aspx.*
How to use the Sysprep tool to automate successful deployment of Windows XP, Microsoft webpages extracted from archives org, Mar. 11, 2005 http://web.archive.org/web/20050311120919/http://support.microsoft.com/kb/302577/.*
VMware, Virtual Machine to Physical Machine Migration, Vmaware Technical Note, archives-org, Jan. 3, 2006.*
VMware Virtual Center 1-2, User Manual, vmware, Archives-org, May 5, 2005.*
Hu et al, A virtual laboratory for IT security education, EMISA 2004, p. 56, 60-71, Bonn, 2004.*
How to use Sysprep file with Windows Product Activation or Volume License Media to deploy Windows XP, Microsoft Webpages 2005.*
Nelson et al, Fast Transparent Migration of Virtual Machines, VMware Inc, USENIX Annual Technical Conference, 2005 http://www.usenix.org/event/usenix05/tech/general/full_papers/short_papers/nelson/nelson.pdf.*
Remote Client definition, Webby Foot webpages, archives org, 2005 http://webbyfoot.com/glossary.html http://web.archive.org/web/20050205011803/http://webbyfoot.com/glossary.html.*
Cloning HD Simulation Norton Ghost 2003, youtube, uploaded Dec. 10, 2009, product Norton Ghost 2003 http://www.youtube.com/watch ?v=gOlDlxl9J R0.*
VMware, Virtual Machine to Physical Machine Migration, Vmaware Technical Note, archives-org, Jan. 3, 2006 http://www.vmware.com/support/v2p/doc/V2P_TechNote.pdf.*
VMware Virtual Center 1-2, User Manual, vmware, Archives-org, May 5, 2005 http://www.vmware.com/pdf/VC_Users_Manual_11.pdf.*
Nelson et al, Fast Transparent Migration of Virtual Machines, VMware Inc, USENIX Annual Technical Conference, 2005http://www.usenix.org/event/usenix05/tech/general/full_papers/short_papers/nelson/nelson.pdf.*
"European Application Serial No. 08102534.8 Search Report dated Aug. 11, 2008", 9 pgs.
Chou, S C, et al., "Preventing information leakage within workflows that execute among competing organizations", Journal of Systems and Software, Elsevier North Holland, New York, NY, US archive, 75, XP004650952, (Feb. 15, 2005), 109-123.
Kang, M, et al., "Access control mechanisms for inter-organizational workflow", Proceedings of the sixth ACM symposium on Access control models and technologies, Paper 11 claims how to enforce separation of duty constraints in a collab. workflow. However, no further description of how they do it, (2001), 66-74.

(56) References Cited

OTHER PUBLICATIONS

Miller, John A, et al., "Security for the METEOR Workflow Management System", http://www.itd.nrl.navy.mil/ITD/5540/publications/Chacs/1999/./1999kang-CAISE99.ps, XP002490241, retrieved on Jul. 24, 2008 by the European Patent Office, (1999), 1-33.

Wu, et al., "Authorization and Access Control of Application Data in Workflow Systenls", Journal of Intelligent Information Systems, 18, (2002), 24 pgs.

"European Application Serial No. 08102534.8, Search Report dated Jan. 8, 2008", 7 pgs.

Greenberg, M. S., et al., "Mobile Agents and Security", *Communications Magazine, IEEE*, 36 (7), (Jul. 1998), 28 pgs.

Hollingsworth, D, "Workflow Management Coalition, The Workflow Reference Model", Document No. TC00-1003, (Jan. 19, 1995), pp. 1-55.

Bultmeyer, Jonathan, et al., "Distributed Workflow Techniques", U.S. Appl. No. 11/065,897, filed Feb. 25, 2005., 46 pgs.

Housley, R, et al., "Internet X.509 Public Key Infrastructure Certificate and Certificate Revocation List (CRL) Profile", Network Working Group Request for Comments:3280, The Internet Society, (2002), 1-121.

\* cited by examiner

IMAGED-BASED METHOD FOR TRANSPORT AND AUTHENTICATION OF VIRTUALIZED WORKFLOWS

RELATED APPLICATIONS

The present invention claims priority to and is Continuation-In-Part of U.S. Ser. No. 11/677,250 entitled: "Dynamic Workflow Resource Authentication and Discovery;" filed on Feb. 21, 2007 now abandoned; the disclosure of which is incorporated by reference herein.

FIELD

The invention relates generally to workflow processing. More particularly, the invention relates to techniques for virtualizing workflow processing.

BACKGROUND

Workflow and business processes are critical to the daily operations of most enterprises. In fact, enterprises have increasingly attempted to automate their daily operations in an effort to streamline expenses and reduce product or service time to market. These operations are often referred to as tasks associated with a workflow. Each task has a number of inter-task dependencies, such that a particular task may require that other tasks be completed before that particular task can be addressed. A product or service release may entail traversing many tasks within an enterprise before the product or service is actually released.

One problem associated with workflow processing is that it is often static in nature. In other words, when a workflow or set of tasks are being monitored, the users that can assist in handling the tasks are predetermined and known in advance. So, if a particular user is offline when a workflow begins processing then that user may not be considered as a candidate to assist in tasks of the resource should the user subsequently come on line and be available. This is can be a significant issue in dynamic and chaotic environments, where users log in to and out of their enterprise's systems with increasing regularity. Thus, the true nature of the enterprise's environment is not capable of being properly reflected and handled with traditional workflow processing.

Another problem associated with workflow processing is security. Intruders are becoming more and more adept at feigning the appearance of legitimate users in order to penetrate and comprise enterprise systems. As a result, enterprises have instituted a variety of security measures. Many workflow related security issues stem from the fact that an enterprise is diverse and includes operations over a large network. The various components of the workflow may have to interoperate across diverse environments; this flexibility also, unfortunately, presents many security challenges to ensure an intruder has not penetrated the workflow. Because of this, many enterprises have elected to keep workflow processing limited to a defined environment from which security can be more closely monitored and controlled. However, this limits the usefulness and desirability of workflow processing for many enterprises.

Still another problem occurs when a workflow spans multiple processing environments. Often to achieve interoperability, each processing environment needs to manage and maintain the software and data configuration used by a particular workflow system. This can create support and maintenance problems and can prevent some environments from being capable of participating in a workflow. Moreover, unless the workflow system itself is distributed, interoperability may not be practically achieved even with the best of integration plans.

Thus, what are needed are techniques, which allow for improved workflow processing.

SUMMARY

In various embodiments, techniques for virtualized workflow processing are presented. More specifically, and in an embodiment, a method is provided for packaging a workflow for subsequent processing within a different processing environment. A local processing environment associated with workflow processing is packaged into a self-contained image. The self-contained image is supplied with a verifiable identity for use in authenticating itself before the self-contained image is subsequently installed and processed in a remote processing environment. The self-contained image is also configured for the remote processing environment and the configured self-contained image and its identity are sent to the remote processing environment over a wide-area network (WAN) connection.

DETAILED DESCRIPTION

Figure 1:
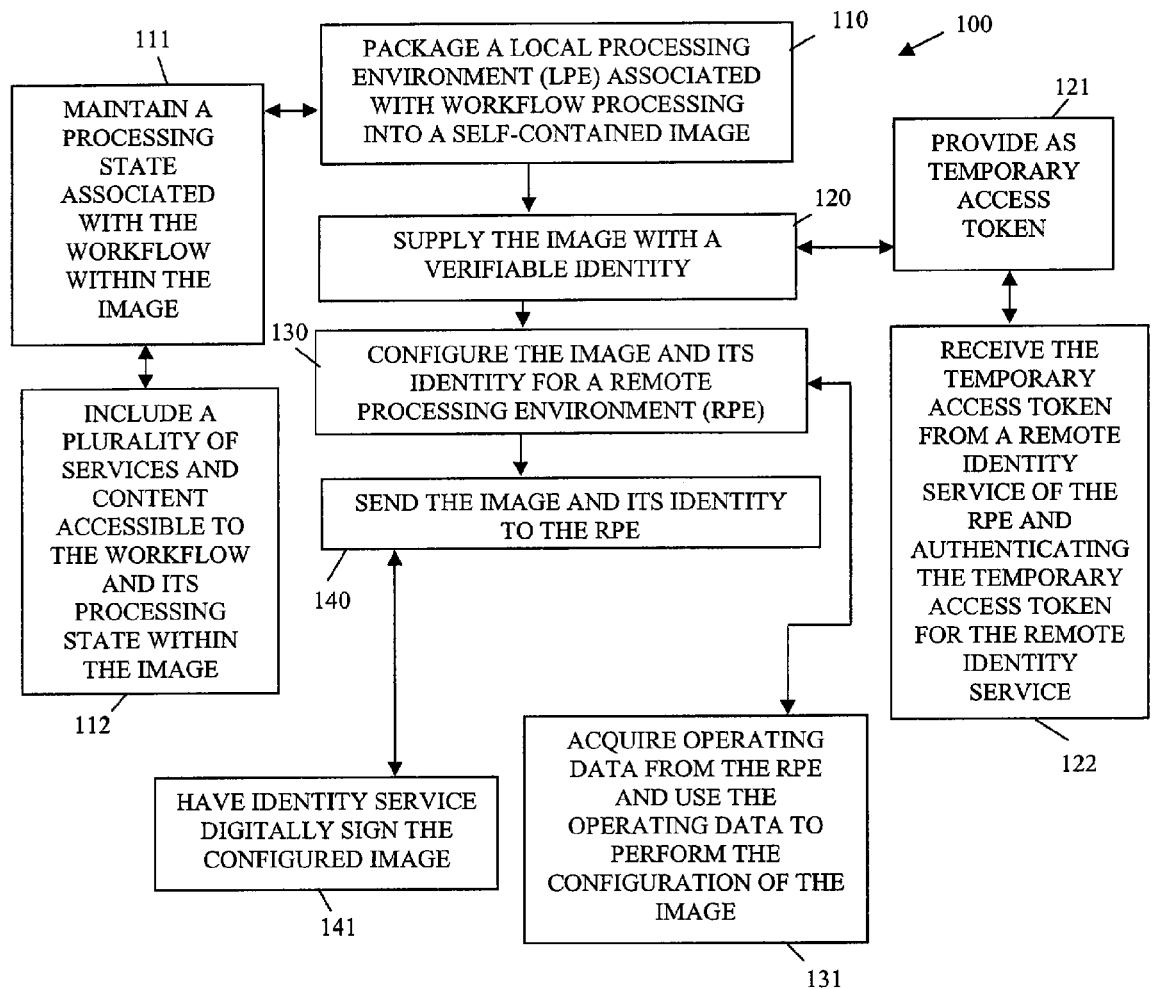
FIG. 1 is a diagram of a method for packaging a workflow for subsequent processing within a different processing environment, according to an example embodiment.

A "workflow" permits the movement or transition of documents, data, and/or tasks through a process. The workflow may be defined for a given process in terms of tasks, which are associated with completing the process. Each task may have interdependencies with other tasks. Business processes may be logically represented within the workflow as interdependent tasks, where each task includes its own documents, data, and dependencies. The workflow itself may be represented in a machine-readable format and accessible to a machine (processing device). The format may be viewed as a data structure or as metadata that is managed by a workflow manager. In an embodiment, the workflow is implemented in an extensible markup language (XML) format.

The term "workflow" may also be used interchangeably herein with the phrase "workflow system." A "workflow system" includes software application and information or content that is used within the context of the workflow. So, a workflow may be viewed as a self-contained processing and content environment.

Each task of a workflow may be viewed as a resource, such as a service, a device, a document, a database, a directory, groupings of these, etc. Furthermore, each task or group of tasks within the workflow may be assigned or associated with another working resource (e.g., worker, owner, etc.), such as a user. Some tasks can be automated while other tasks are partially manual (e.g., a manager's signature approval for a laptop purchase beyond a certain amount). The partially manual tasks may be assigned and handled by defined users having defined roles or permissions, which are set by identity resolution and/or by policy enforcement.

Thus, a resource may include a user, a group of users (perhaps represented by a role assignment), a service, a system, a processing device, a peripheral device, a directory, a document, a storage device, etc. The workflow is made up of resources that are defined as tasks and by other resources that can process and complete the tasks (e.g., owners, auditors, workers, etc.).

In various embodiments presented herein, resources are assigned identities for defined contexts. An identity for a given resource is unique within a given context. Each resource may have more than one identity. Resource identifiers or identity information assist in defining a particular resource's identity. Identities can be semantic or crafted. An example of semantic identities is defined in U.S. patent application Ser. No. 11/261,970 entitled "Semantic Identities," filed on Sep. 28, 2005, commonly assigned to Novell® Inc., of Provo, Utah and the disclosure of which is incorporated by reference herein. An example of crafted identities is described in U.S. patent application Ser. No. 11/225,993 entitled "Crafted Identities," filed on Sep. 14, 2005, commonly assigned to Novell® Inc. of Provo, Utah and the disclosure of which is incorporated by reference herein.

In some cases, a third-party service identified as an identity service or an identity provider is used to authenticate identifiers or identity information of a resource and supply an identity for that resource within a given or requested context. Examples of identity services or identity providers may be found in U.S. patent Ser. No. 10/765,523 entitled "Techniques for Dynamically Establishing and Managing Authentication and Trust Relationships," filed on Jan. 27, 2004; U.S. patent Ser. No. 10/767,884 entitled "Techniques for Establishing and Managing a Distributed Credential Store," filed on Jan. 29, 2004; and U.S. patent Ser. No. 10/770,677 entitled "Techniques for Establishing and Managing Trust Relationships," filed on Feb. 3, 2004. Each of these commonly assigned to Novell® Inc. of Provo, Utah; and the disclosures of which are incorporated by reference herein.

It is also noted that the workflow does not have to be wholly contained and processed within the same environment. That is, the workflow may be distributed and associated with actions that are processed in different and disparate environments. An example, of such workflow processing techniques was presented in U.S. patent Ser. No. 11/065,897 entitled "Distributed Workflow Techniques," filed on Feb. 25, 2005; commonly assigned to Novell®, Inc. of Provo, Utah and the disclosure of which is incorporated by reference herein.

In fact, entire data centers may be dynamically authenticated by an identity service and may handle any given task or set of tasks for a workflow. Thus, and entire data center may be viewed as a single type of resource. An example of identity controlled data centers may be found in U.S. patent Ser. No. 11/583,667 entitled "Identity Controlled Data Center," filed on Oct. 19, 2006; commonly assigned to Novell®, Inc. of Provo, Utah and the disclosure of which is incorporated by reference herein.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A "virtual processing environment" refers to a software constructed sub processing environment that is carved out from or superimposed on a portion of a physical processing environment. A single physical processing environment can have a plurality of different or cloned "virtual processing environments."

A "virtual machine" (VM) may be viewed as a virtual processing environment discussed and described above. The VM is a logical machine that is independent of its physical process environment or physical machine. It may include its own operating system (OS), its own file system (FS), its own directory services, etc., which may each be different from the physical processing environment.

According to an embodiment, the techniques presented herein are implemented in products associated with Identity and Security Management (ISM) distributed by Novell®, Inc. of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

FIG. 1 is a diagram of a method 100 for packaging a workflow for subsequent processing within a different processing environment, according to an example embodiment. The method 100 (hereinafter "virtual workflow packaging service") is implemented as instructions in a machine-accessible and readable medium. The instructions when executed by a machine (processing device) perform the processing depicted in FIG. 1. The virtual workflow packaging service is also operational over and processes within a network. The network may be wired, wireless, or a combination of wired and wireless. In some cases, the network is a wide-area network (WAN), such as the Internet.

At 110, the virtual workflow packaging service packages a local processing environment associated with workflow processing into a self-contained image. That is, an image of a workflow is captured in the local processing environment. According to an embodiment, at 111, the virtual workflow packaging service may also maintain a processing state associated with the workflow within the image. Furthermore, at 112, the virtual workflow packaging service may include a plurality of services and content accessible to and consumed by the workflow along with the processing state within the image.

So, the self-contained image represents an independent processing environment captured from the local processing environment for the workflow.

At 120, the virtual workflow packaging service supplies the image with a verifiable identity. In an embodiment, at 121, this can be achieved by providing the identity as a temporary access token. At 122, the virtual workflow packaging service receives the temporary access token back from a remote processing environment when the remote processing environment attempts to authenticate the self-contained image and initiate that image as a virtual machine within one or more machines of the remote processing environment. Since, it is the virtual workflow packaging service that original supplies the temporary access token, the virtual workflow packaging service can easily detect whether the temporary access token is legitimate when it is received from the remote processing environment via the remote identity service.

At 130, the virtual workflow packaging service configures the self-contained image and its identity for a target or remote processing environment. In an embodiment, at 131, this may entail that the virtual workflow packaging service interact with one or more services within the target remote processing environment to acquire operating data, such as processor and memory resources, etc. associated with the remote processing environment. Examples associated with achieving this can be found in the Identity Controlled Data Center Application that was incorporated by reference herein and above.

At 140, the virtual workflow packaging service sends the configured image and its identity to the target remote processing environment via a WAN, such as the Internet. In some cases, the virtual workflow packaging service may also have the configuration, the image, and/or the identity all or partially digitally signed by a trusted third party service, such as a local identity service that is local or within the local processing environment of the virtual workflow packaging service.

Thus, the identity and the signature can be used within the remote processing environment to authenticate and validate the image and ensure that it has not been tampered with before the image is initiated as a VM that processes the workflow in the remote processing environment.

The virtual workflow packaging service permits a workflow to be portable and transmitted to a plurality of disparate and different remote processing environments over a network (e.g., WAN, etc., such as the Internet). The target environment does not have to have any particular software resources or versions of software or hardware configurations to process the workflow, this can be handled by instantiating the image packaged within the target environment as an independent VM (discussed below with reference to the FIG. 2).

In fact, the entire processing associated with the virtual workflow packaging service may be transparent to a user. So, a user could be processing within the local processing environment of the virtual workflow packaging service and where there exits a task; either the user or policy associated with the workflow itself then detects that another user is to process a next workflow task. When this occurs, the user, a proxy, or actions triggered from within the workflow can initiate the virtual workflow packaging service, which then packages the entire workflow processing state and environment, suite of services, and information performing the processing depicted in FIG. 1.

It is also to be noted that the processing at 140 may be achieved indirectly. That is, a user may receive the image and manually post it to a collaborative World-Wide Web (WWW) site or manually attach it to an email or other type of message and then the user sends it to the remote processing environment by directing it to another target user.

Figure 2:
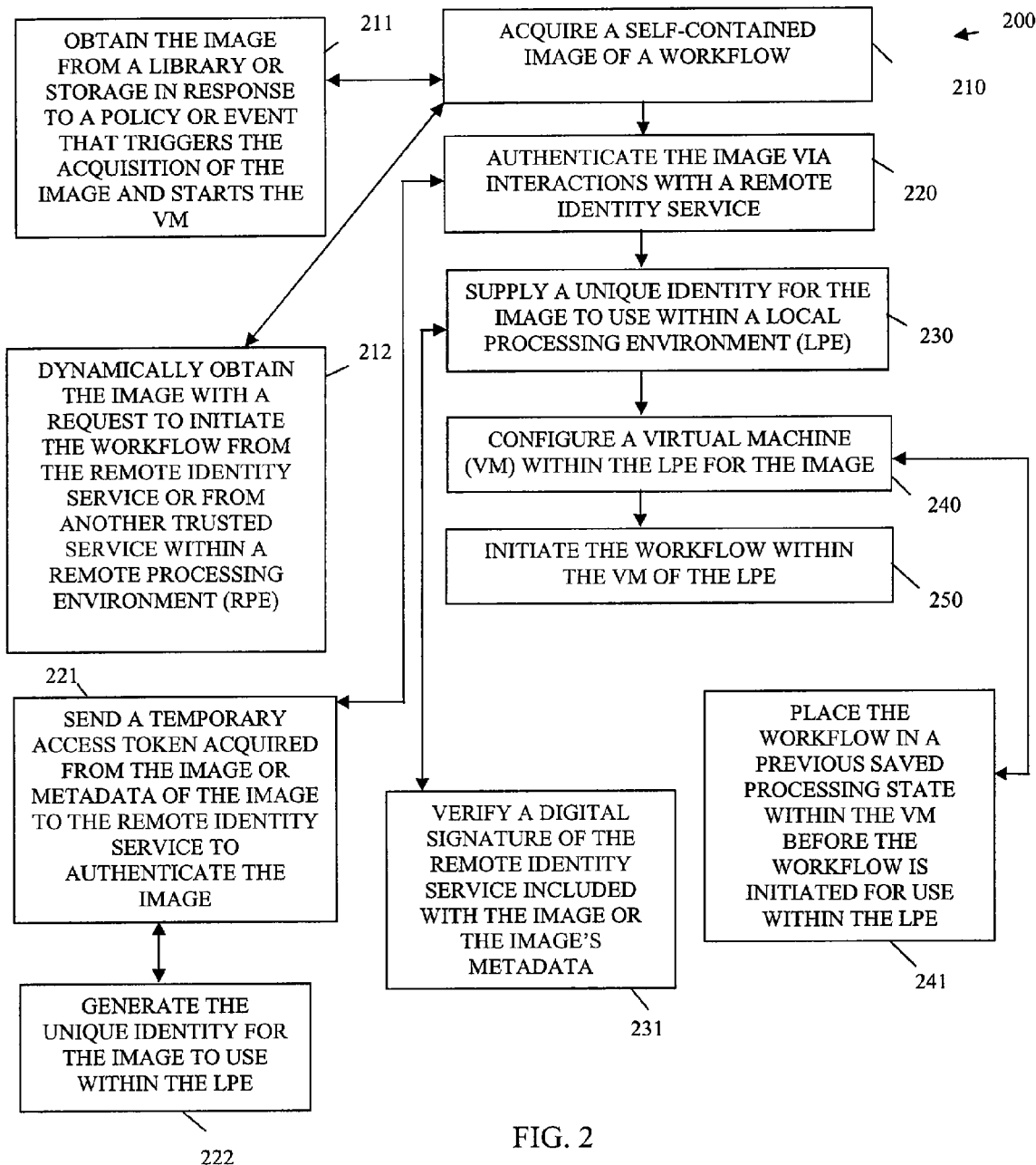
FIG. 2 is a diagram of method for initiating a virtual workflow within a processing environment from an image, according to an example embodiment.

FIG. 2 is a diagram of method 200 for initiating a virtual workflow within a processing environment from an image, according to an example embodiment. The method 200 (herein after referred to as "virtual workflow initiation service") is implemented in a machine-accessible and readable medium as instructions, which when accessed by a machine performs the processing depicted in the FIG. 2. The virtual workflow initiation service is also operational over a network; the network may be wired, wireless, or a combination of wired and wireless. The virtual workflow initiation service represents actions taken to start a virtual workflow within a target processing environment; the virtual workflow received from the virtual workflow packaging service represented by the method 100 of the FIG. 1.

At 210, the virtual workflow initiation service acquires a self-contained image of a workflow. The self-contained image may be initially acquired in a variety of different manners. For example, at 211, the virtual workflow initiation service may acquire the self-contained image from a library or other storage in response to a policy directive or a detected event, which triggers the acquisition of the self-contained image and starts the VM (discussed with 250 below).

In another situation, at 212, the virtual workflow initiation service may dynamically obtain the self-contained image as part of or with a request to initiate the workflow from a remote identity service (discussed with 220) or from another trusted service within the remote processing environment.

The method 100 was presented from the perspective that it was the local processing environment and the method 200 was remote to the method 100. Conversely, the method 200 is presented from a perspective that it is within a local processing environment and the method 100 is remote there from over a WAN connection. The method 100 produces the self-contained image of the workflow, and the method 200 instantiates that image as a workflow for further processing.

At 220, the virtual workflow initiation service authenticates the image via one or more interactions with a remote identity service. This can be achieved in a number of manners. In one case, at 221, the virtual workflow initiation service may send a temporary access token acquired from the self-contained image or from metadata associated with the image to the remote identity service for purposes of authenticating the image. In response to a successful authentication, at 222, the virtual workflow initiation service may generate the unique identity for the self-contained image to use within the local processing environment.

In other words, the image is packaged with a token a special service packaged with the image in combination with perhaps a local identity service locates the temporary access token and submits it to the remote identity service over a WAN connection for authentication.

If authenticated, the local identity service supplies a permanent identity for the image to assume within the local processing environment that is unique within the context of the local processing environment. Accordingly, at 230, the virtual workflow initiation service supplies the unique identity for the image to use within the local processing environment.

In some cases, at 231, the virtual workflow initiation service may also verify a digital signature of the remote identity service that was included with the image or the image's metadata. So, the entire image may be signed by the remote identity service and the virtual workflow initiation service may itself or may use a local identity service to verify that the image is unchanged from when it was received from the remote processing environment. This can be achieved by verifying the signature of the image.

At 240, the virtual workflow initiation service configures a virtual machine (VM) within the local processing environment for the image or workflow. In an embodiment, at 241, the virtual workflow initiation service may also place the workflow or bring the workflow up to a particular processing state within the VM before the workflow is permissibly initiated or started for use within the local processing environment.

At 250, the virtual workflow initiation service initiates the workflow within the VM of the local processing environment. At this point, the workflow is available to perform a next task by a particular resource or user. So, if the virtual workflow packaging service represented by the method 100 of the FIG. 1 packaged the workflow after user A completed Task T, at 250, the same workflow is available for user B to complete or work on Task T+1; where the processing environments of users A and B are different from one another. In fact, the processing environment of user B may not have any resources natively available to process the workflow at all until the VM is initiated. The VM includes the entire workflow, all its needed resources and data, which is then superimposed over the hardware environment of user B's processing environment.

Figure 3:
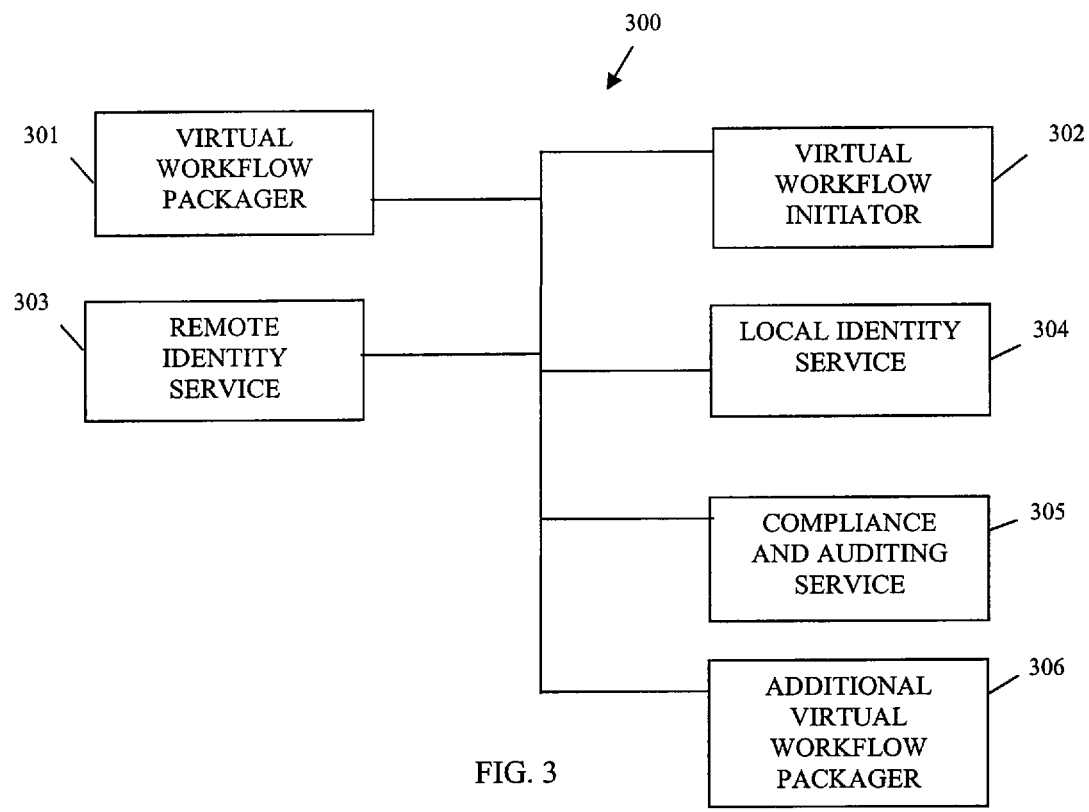
FIG. 3 is a diagram of virtualized workflow processing system, according to an example embodiment.

FIG. 3 is a diagram of virtualized workflow processing system 300, according to an example embodiment. The virtualized workflow processing system 300 is implemented as instructions on or within a machine-accessible and readable medium. The instructions when executed by a machine perform processing depicted with respect to the methods 100 and 200 of the FIGS. 1 and 2, respectively. The virtualized workflow processing system 300 is also operational over a network and the network may be wired, wireless, or a combination of wired and wireless.

The virtualized workflow processing system 300 includes a virtual workflow packager 301 and a virtual workflow initiator 302. In some cases, the virtualized workflow processing system 300 may also include a remote identity service 303, a local identity service 304, a compliance and auditing service 305, and/or an additional virtual workflow packager 306. Each of these and their interactions with one another will now be discussed in turn.

The virtual workflow packager 301 is embodied and implemented in a machine or computer readable medium on a remote machine within a remote processing environment. Example processing associated with the virtual workflow packager 301 was presented above in detail with reference to the virtual workflow packaging service represented by the method 100 of the FIG. 1.

The virtual workflow packager 301 when it is initiated and processed produces or creates a self-contained image of a particular processing state associated with a workflow. The virtual workflow packager 301 also supplies a temporary identity or temporary access code to the image. Furthermore, the virtual workflow packager 301 sends directly or indirectly the image and the temporary identity to the virtual workflow initiator 302 over a WAN, such as the Internet. When imaging the workflow, the virtual workflow packager 301 may acquire operating data (processor, memory, OS configuration data, etc.) from a processing environment associated with the virtual workflow initiator 302. This assist in properly configuring the image for use in the environment of the virtual workflow initiator 302.

The virtual workflow initiator 302 is implemented in a machine accessible and readable medium and is to process on a local machine associated with a local processing environment. Example processing associated with the virtual workflow initiator 302 was presented above in detail with reference to the virtual workflow initiation service represented by the method 200 of the FIG. 2.

The virtual workflow initiator 302 when it is initiated to process an image associated with a workflow within the local processing environment, uses the temporary identity to validate the image and initiate the workflow within the local processing environment as a virtual machine (VM). Furthermore, the virtual workflow initiator 302 places or brings the workflow within the VM back up to the processing state captured in the image by the virtual workflow packager 301.

According to an embodiment, the virtual workflow initiator 302 may initiate the workflow in the VM in response to one or more of the following situations or circumstances: a dynamic request from the virtual workflow packager 301, a policy evaluation, a scheduling constraint, an attempt by a resource within the local environment to activate the image (e.g., user tries to open the image, etc.), and/or an event detection.

In some cases, the virtualized workflow processing system 300 also includes a remote identity service 303. The remote identity service is embodied and implemented in a machine accessible and readable medium on a remote machine within the remote processing environment. Example identity services were described and incorporated by reference above.

The remote identity service 303 may interact with the virtual workflow packager 301 within the remote processing environment and may interact over a WAN connection, such as the Internet, with the virtual workflow initiator 302 or other trusted and authenticated services associated with the local processing environment. The remote identity service 303 supplies the temporary identity for the workflow image that is packaged and assists the virtual workflow initiator 302 in validating or authenticating the temporary identity over the network.

According to an embodiment, the virtualized workflow processing system 300 also includes a local identity service 304. The local identity service is embodied and implemented in a machine accessible and readable medium on a local machine within the local processing environment. Again, example identity services were described and incorporated by reference above.

The local identity service 304 may interact with the remote identity service 303 over the WAN on behalf of the virtual workflow initiator 302. The local identity service 304 may also provide a unique identity for the virtual machine to use within the local processing environment. That is, once the temporary identity is verified by the remote identity service 303, the local identity service 304 assigns a permanent and unique identity to the VM and/or workflow for usage within the context of the local processing environment.

In some cases, the virtualized workflow processing system 300 may also include a compliance and auditing service 305 implemented in a machine accessible and readable medium on a machine within the local processing environment.

The compliance and auditing service 305 uses policy to capture and report activities associated with the workflow as it is processed within the VM. The types of information captured, the manner in which it is reported, the timing for reporting, the recipients of the reporting, and any notifications raised in response to the auditing may all be driven by the policy.

In another situation, the virtualized workflow processing system 300 includes an additional virtual workflow packager 306 implemented in a machine accessible and readable medium and to process on a machine within the local processing environment.

The additional virtual workflow packager 306 permits the workflow to be modified within the local processing environment and then repackaged for delivery as a new image to another processing instance of a virtual workflow initiator 302 located and processing in an entirely different environment over a network, such as the Internet.

Figure 4:
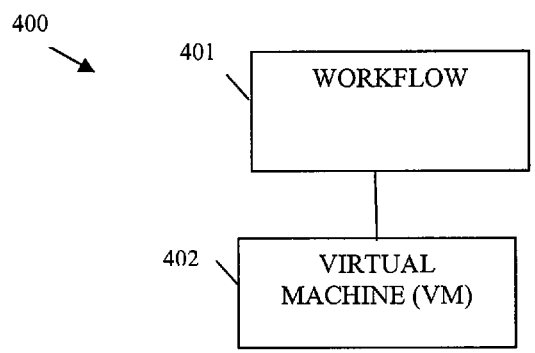
FIG. 4 is a diagram of another virtualized workflow processing system, according to an example embodiment.

FIG. 4 is a diagram of another virtualized workflow processing system 400, according to an example embodiment. The virtualized workflow processing system 400 is implemented as instructions on or within a machine-accessible and readable medium. The instructions when executed by a machine perform, inter alia; processing depicted with respect to the method 200 the FIG. 1. The virtualized workflow processing system 400 is also operational over a network and the network may be wired, wireless, or a combination of wired and wireless.

The virtualized workflow processing system 400 includes a workflow 401 and a virtual machine 402. Each of these will now be discussed in turn.

The workflow 401 is a data structure or metadata embodied in a machine-readable medium and capable of being read and modified by a machine process. In an embodiment, the workflow 401 is an XML-defined data structure that includes a variety of information to identity tasks of a business process and each task having a variety of resources. The workflow 401 may also include or be associated with software services and information or content repositories. The workflow 401 may be viewed as a processing environment for performing tasks.

According to an embodiment, workflow 401 includes a plurality of tasks. Each task is capable of being handled by one or more resources. Some tasks may be services or resources that are within a local or first processing environment of the virtual machine 402 while others of the tasks may be services or resources that are external and remote to the first processing environment of the virtual machine 402.

The workflow 401 is capable of being imaged and subsequently loaded and processed within instances of virtual machines 402 in a variety of different and disparate processing environments over a network, such as a WAN (e.g., Internet, etc.).

The workflow 401 is extracted from an image and a configuration created within a second and different processing environment from the first processing environment associated with where the workflow 401 is installed and loaded within a VM 402. Example processing associated with achieving this was discussed in detail above with reference to the method 100 of the FIG. 1 and the system 300 of the FIG. 3.

The virtual machine (VM) 402 is also implemented as a set of software instructions that reside on a machine-accessible and readable medium and is capable of being processed on a machine of the first processing environment.

The VM 402 is started and the extracted workflow 401 is initiated within it; within the first processing environment or the processing environment associated with where the VM 402 is started and processing. The workflow 401 is then brought up to a processing state defined in the configuration associated with the workflow 401. In another case, the image is initiated and the VM 402 started when a user activates the image from an attachment associated with a message or a posting.

According to an embodiment, the VM 402 is started when one or more of the following occurs or is detected: a specific request is made or raised, a resource activates the image, an event is detected, and/or a schedule limitation dictates.

In some situations, the VM 402 is authenticated and receives a unique identity for processing within the first processing environment via interactions with a local identity service and remote identity service associated with the second processing environment. This was described above in detail with reference to the system 300 of the FIG. 3.

According to an embodiment, the configuration may also include a digital signature of the remote identity service that the local identity service of the first processing environment uses to further verify that the image has not been tampered with before it is initiated as the workflow 401 within the VM 402. The image may include a plurality of services usable by the workflow 401 and also content or information consumed by the workflow 401, when the workflow 401 processes within the VM 402.

The workflow 401 is modified within the VM 402 of the first processing environment and in some cases can then be re-imaged and configured and then sent to a third disparate processing environment that is different from the first and second processing environments. Thus, each processing environment can have a packaging service and an initiation service as described above with reference to the system 300 of the FIG. 3. This permits the workflow to be securely transmitted, authenticated, and processed in any processing environment and without any pre-configuration or pre-installed resources needed to support the workflow since the image is self-contained.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer implemented method comprising:

packaging, after a first user completed a first task of a workflow, a local processing environment associated with the workflow into a self-contained image together with a temporary access token representing a verifiable identity wherein the self-contained image and its verifiable identity are digitally signed by a local identity service within the local processing environment, and the local processing environment is packaged by a virtual workflow packaging service executed by a processing device;

supplying, by the virtual workflow packaging service, the self-contained image with the temporary access token for authenticating the self-contained image before the self-contained image is subsequently installed and processed in a remote processing environment;

configuring, by the virtual workflow packaging service, the self-contained image and its verifiable identity for targeting to the remote processing environment, wherein said configuring is digitally signed by the local identity service and wherein said configuring further acquires processor and memory resources associated with the remote processing environment;

sending the configured self-contained image and its verifiable identity to the remote processing environment via a network;

obtaining, by a virtual workflow initiation service, the self-contained image in response to a directive that triggers an acquisition of the self-contained image;

sending, by the virtual workflow initiation service via the network, the temporary access token acquired from the self-contained image to a remote identity service for authenticating the self-contained image, and, in response to a successful authentication, generating, to the self-contained image, a permanent unique identity to be used within the local processing environment;

supplying, by the virtual workflow initiation service, the permanent unique identity of the self-contained image for use within the local processing environment;

verifying, by the virtual workflow initiation service after supplying the permanent unique identity, that the digitally signed self-contained image is unchanged from when it was received from the remote processing environment;

configuring, by the virtual workflow initiation service, a virtual machine within the local processing environment for the workflow;

placing the workflow to a processing state within the virtual machine before the workflow is initiated for use within the local processing environment;

initiating, by the virtual workflow initiation service, the workflow within the virtual machine of the local processing environment, to a second user to complete a subsequent task in response to a scheduling constraint, by superimposing the processor and memory resources included in the virtual machine over a hardware environment of the second user; and capturing and reporting, using a policy executed by an auditing service, activities associated with the workflow as it is initiated within the virtual machine, according to a type of information captured, a manner in which said information is reported, a timing of the reporting, recipients of the reporting and notifications raised in response to the auditing service.

2. The computer implemented method of claim 1, further comprising:

modifying and repackaging, using an additional workflow packager, the workflow within the local processing environment into a new image;

delivering the new image to another processing instance of the virtual workflow initiation service located in a different environment over the network.

* * * * *